(12) United States Patent
Monzani et al.

(10) Patent No.: US 11,591,536 B2
(45) Date of Patent: Feb. 28, 2023

(54) (PER)FLUOROPOLYETHER POLYMERS

(71) Applicant: SOLVAY SPECIALTY POLYMERS ITALY S.P.A., Bollate (IT)

(72) Inventors: Cristiano Monzani, Trezzo sull'Adda (IT); Marco Galimberti, Bollate (IT); Vito Tortelli, Milan (IT)

(73) Assignee: SOLVAY SPECIALITY POLYMERS ITALY S.P.A., Bollate (IT)

( * ) Notice: Subject to any disclaimer, the term of this patent is extended or adjusted under 35 U.S.C. 154(b) by 144 days.

(21) Appl. No.: 17/251,524

(22) PCT Filed: Jun. 19, 2019

(86) PCT No.: PCT/EP2019/066155
§ 371 (c)(1),
(2) Date: Dec. 11, 2020

(87) PCT Pub. No.: WO2019/243403
PCT Pub. Date: Dec. 26, 2019

(65) Prior Publication Data
US 2021/0246394 A1    Aug. 12, 2021

(30) Foreign Application Priority Data

Jun. 20, 2018  (EP) .................................... 18178895

(51) Int. Cl.
*C10M 107/38*    (2006.01)
*C08G 65/00*    (2006.01)
*C08G 65/331*    (2006.01)
*C10N 40/18*    (2006.01)

(52) U.S. Cl.
CPC ......... *C10M 107/38* (2013.01); *C08G 65/007* (2013.01); *C08G 65/3317* (2013.01); *C10M 2213/0606* (2013.01); *C10N 2040/18* (2013.01)

(58) Field of Classification Search
CPC .............. C08G 65/007; C08G 65/3317; C08G 65/3315; C10M 107/38; C10M 2213/0606; C10M 2213/0623; C10N 2040/18
See application file for complete search history.

(56) References Cited

U.S. PATENT DOCUMENTS

| 3,810,874 A | 5/1974 | Mitsch et al. |
| 5,185,421 A | 2/1993 | Cohen et al. |
| 2016/0137947 A1 | 5/2016 | Isobe et al. |

FOREIGN PATENT DOCUMENTS

| EP | 1522536 A1 | 4/2005 |
| EP | 2100909 A1 | 9/2009 |
| EP | 3059265 A1 | 8/2016 |
| WO | 2010057691 A2 | 5/2010 |
| WO | 2013092632 A1 | 6/2013 |
| WO | 2019243404 A1 | 12/2019 |

OTHER PUBLICATIONS

Sir Allen G. et al., "Structure-Property Relationships in Perfluoropolyethers: A Family of Polymeric Oils", Comprehensive Polymer Science, Second Supplement, 1996, Chapter 9, pp. 347-388.
Feiring A.E., "Synthesis of New Fluoropolymers: Tailoring Macromolecular Properties with Fluorinated Substituents", Part A: Pure and Applied Chemistry, Journal of Macromolecular Science, Part A: Pure and Applied Chemistry, 1994, vol. A31, No. 11, pp. 1657-1673.
Yang S. et al., "Novel fluorine-containing anionic aqueous polyurethanes", Journal of Macromolecular Science, Part A: Pure and Applied Chemistry, 1993, vol. 30, No. 2-3, pp. 241-252.

*Primary Examiner* — Vishal V Vasisth
(74) *Attorney, Agent, or Firm* — Osha Bergman Watanabe & Burton LLP

(57) ABSTRACT

The present invention relates to a novel process for the synthesis of (per)fluoropolyether polymers, to certain novel (per)fluoropolyether polymers. The present invention also relates to the use of the (per)fluoropolyether polymers thus obtained as intermediate compounds for the manufacture of further polymers suitable for use as lubricants, notably for magnetic recording media (MRM).

16 Claims, No Drawings

(PER)FLUOROPOLYETHER POLYMERS

CROSS-REFERENCE TO RELATED APPLICATIONS

This application is a U.S. national stage entry under 35 U.S.C. § 371 of International Application No. PCT/EP2019/066155 filed Jun. 19, 2019, which claims priority from European Patent Application No. 18178895.1, filed on Jun. 2, 2018. The entire contents of these applications are explicitly incorporated herein by this reference.

TECHNICAL FIELD

The present invention relates to a novel process for the synthesis of (per)fluoropolyether polymers containing cyclic structures in their main backbone, and to certain novel (per)fluoropolyether polymers comprising cyclic structures in their main backbone. The present invention also relates to the use of the (per)fluoropolyether polymers thus obtained as intermediate compounds for the manufacture of further polymers, and to the use of the (per)fluoropolyether polymers thus obtained or derivatives thereof as lubricants, notably for magnetic recording media (MRM).

BACKGROUND ART

Among fluorinated polymers, (per)fluoropolyether polymers (PFPEs) are well-known and of great interest for their chemical and physical properties, which make them particularly interesting as lubricants.

Several synthesis of PFPEs polymers have been disclosed in the art. The first synthesis of unspecified perfluorinated polyether mixtures was reported in 1953, when an oily product was obtained in the course of photoligomerization of hexafluoropropene. Since then, a number of different perfluorinated polyethers have been synthesized and described in literature. (ALLEN, Geoffrey, et al. COMPREHENSIVE POLYMER SCIENCE—Second supplement. Edited by SIR ALLEN, Geoffrey, et al. Elsevier Science, 1996. ISBN 0080427081. p. 347-388).

For example, the catalytic polymerization of perfluoroepoxides, such as notably hexafluoropropylene oxide (HFPO), firstly disclosed by Du Pont researchers, led to a product commercially available under the trade name Krytox®, which has a backbone comprising recurring units of formula $-[CF(CF_3)CF_2O]_y-$. Then, Montedison researchers disclosed the photochemical oxidation of perfluoro-olefins, such as tetrafluoroethylene and hexafluoropropene, which led to a product commercially available under the trade name Fomblin®, which has a backbone comprising randomly distributed recurring units of formula $-[(CF_2O)_m(CF_2CF(R)O)_n]-$ wherein R if $-F$ or $-CF_3$. Another synthesis, which involved the ring opening polymerisation of partially fluorinated oxetanes followed by fluorination, was disclosed by Daikin Company and led to a product commercially available under the trade name Demnum®, which has a backbone comprising recurring units of formula $-(CF_2CF_2CF_2O)_p-$.

The main difference between the (per)fluoropolyether polymers known in the art resides in the fact that Krytox® polymers and Demnum® polymers are homopolymers characterized by an ordered structure, which comprises only one type of recurring unit, i.e. $-[CF(CF_3)CF_2O]_y-$ and $-(CF_2CF_2CF_2O)_p-$, respectively. Differently, Fomblin® polymers are copolymers characterized by the presence of two or more recurring units having a different formula and being randomly (or statistically) distributed along the backbone chain. This random (or statistical) distribution of the recurring units is due to the manufacturing process, that is based on photochemical oxidation. However, the random distribution of the recurring units could led to a backbone chain comprising multiple consecutive recurring units having one carbon atoms (i.e., of formula $-CF_2O-$), which on the one hand increase the flexibility of the polymer backbone but on the other hand constitute a weak point in the polymer backbone, as they are more easily attacked by metals and/or Lewis acids.

The polymerization of fluorinated vinyl ether alcohols, followed by fluorination of the intermediate partially-fluorinated structure, was disclosed by FEIRING, Andrew E. Synthesis of New Fluoropolymers: Tailoring Macromolecular Properties with FLuorinated Substituents. *Journal of Macromolecular Science*. 1994, vol. A31, no. 11, p. 1657-1673. However, the first approach described in this article starts from a partially fluorinated compound bearing within the same molecule both the hydroxy group and vinyl ether group (i.e., $CF_2=CFOCF_2CF(CF_3)OCF_2CF_2CH_2OH$), such that final polymer has a backbone comprising only one recurring unit of formula $-(CF_2CF_2OCF_2CF(CF_3)OCF_2CF_2CF_2O)_n-$. Another approach described in this article comprises the reaction between the compound mentioned above of formula $CF_2=CFOCF_2CF(CF_3)OCF_2CF_2CH_2OH$ and a partially fluorinated diol (for example of formula $HOCH_2(CF_2)_3CH_2OH$) to provide telechelic macrodiols to be used for the production of further copolymers, such as for example those described in U.S. Pat. No. 5,185,421 (E.I. DU PONT DE NEMOURS AND COMPANY) and by YANG, S., et al. Novel fluorine-containing anionic aqueous polyurethane. *Journal of Macromolecular Science*. 1993, vol. 30, p. 241-252.

EP 3 059 265 (3M Innovative Properties Company) discloses curable fluoropolymer containing repeating units derived from VDF and TFE and at least one other fluorinated comonomer and further containing $-CF_2CH_2I$ end groups and branching sites derived from one or more perfluorinated bisolefinic ether(s) used as modifier(s).

Nevertheless, no method has been made available which would enable synthesising with high yields and convenient manner partially (HFPE) and fully fluorinated polyether (PFPE) polymers containing cyclic structures in their main backbone.

Actually, the presence of a plurality of cyclic structures in the backbone of partially (HFPE) and fully fluorinated polyether (PFPE) polymers is an interesting structural feature for modifying chain mobility and confer to the resulting materials increased configurational stiffness, which would be particularly beneficial for improving certain advantageous properties, including notably their ability to perform as lubricants under severe conditions.

SUMMARY OF INVENTION

The Applicant faced the problem of preparing (per)fluoropolyether polymers mixtures comprising a plurality of cyclic structures in the backbone, i.e. (per)fluoropolyether polymers characterized by recurring units which have an a priori defined distribution, with alternated cyclic moieties and other moieties, so as to provide for structures whereas chain mobility and stiffness can be tuned and adapted, aiming at improving mechanical performances.

Similarly, there's an unfilled need in the art for (per)fluoropolyether polymers mixtures with well-defined sequences of recurring units including cyclic structures, advantageously able to deliver outstanding mechanical properties.

Surprisingly, the Applicant found a process, which can be conveniently applied on industrial scale, for the synthesis of mixtures of compounds, having regularly alternated recurring units comprising cyclic moieties.

In a first aspect, the present invention relates to a method [method ($M_{FH}$)] for the synthesis of a mixture of polymers comprising a partially fluorinated polyether backbone possessing a plurality of recurring units including at least one cyclic group and having two chain ends, wherein said chain ends comprise at least one group selected from hydroxy group, allyl group and vinyl group [mixture (FH)], said process comprising the step of:

Step (1): A Step of Reacting:

(1a) at least one fluorinated compound [compound (F)] comprising at least two unsaturated groups selected from vinyl groups and allyl groups, and (1b) at least one fully or partially hydrogenated compound [compound (H)] comprising at least two hydroxy groups, to provide a mixture (FH), wherein:

(i) at least one compound (F) is a compound ($F^c$) of formula:

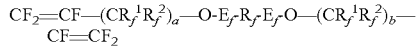

$CF_2=CF-(CR_f^1R_f^2)_a-O-E_f-R_{cf}-E_f-O-(CR_f^1R_f^2)_b-CF=CF_2$ wherein:

$R_{cf}$ is a divalent fluorocarbon cyclic group, which may be a cycloaliphatic or a cycloaromatic group, which may comprise one or more than one cyclic moiety, and which may comprise one or more than one heteroatom included in the cycle, said heteroatom being selected from N, O and S;

each of $E_f$, equal to or different from each other, is a bond, or a divalent fluorocarbon group, possibly comprising one or more than one heteroatoms selected from Cl, N, O and S;

each or $R_f^1$ and $R_f^2$, equal to or different from each other, is F or a $C_1$-$C_6$ perfluorocarbon group;

a and b being independently zero or 1, preferably being equal to each other, and being collectively zero or 1; and/or (ii) at least one compound (H) is a compound ($H^c$) of formula:

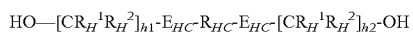

$HO-[CR_H^1R_H^2]_{h1}-E_{HC}-R_{HC}-E_{HC}-[CR_H^1R_H^2]_{h2}-OH$ wherein:

each of $E_{HC}$ is selected from a bond, a —O— group and a divalent linear or branched (oxy)alkylene group, wherein said (oxy)alkylene group comprises from 1 to 8 carbon atoms and is optionally interrupted by one or more than one ethereal oxygen atom;

$R_{HC}$ is divalent hydrocarbon cyclic group, which may be a cycloaliphatic or a cycloaromatic group, which may comprise one or more than one cyclic moiety, and which may comprise one or more than one heteroatom included in the cycle, said heteroatom being selected from N, O and S;

h1 and h2 being independently zero or 1, preferably being equal to each other, and being collectively zero or 1;

each of $R_H^1$ and $R_H^2$, equal to or different from each other at each occurrence, is independently H or a $C_1$-$C_6$ hydrocarbon group.

Advantageously, the process according to the present invention allows to prepare polymers comprising a (per)fluoropolyether backbone comprising recurring units which are distributed within the backbone in a pre-determined and well defined way, which comprise cyclic moieties which may be alicyclic moieties, aromatic moieties, aliphatic heterocyclic moieties, heteroaromatic moieties, and the like.

The polymer mixture (FH) which may be obtained after Step (I) of method ($M_{FH}$) according to the present invention is another object of the present invention.

Thus, in a second aspect, the present invention relates to a mixture [mixture (FH)] of polymers comprising a partially fluorinated polyether backbone possessing a plurality of recurring units including at least one cyclic group and having two chain ends, wherein each of said chain ends comprises a group selected from hydroxy group, allyl group or vinyl group; and said backbone comprises recurring units selected from the group consisting of units ($R_{FcH}$) and units ($R_{FHc}$):

unit ($R_{FcH}$): —O—$CF_2CHF$—$(CR_f^1R_f^2)_a$—O-$E_{cf}$-$R_{cf}$-$E_{cf}$-O—$(CR_f^1R_f^2)_b$—$CFHCF_2$—O—$[CR_H^1R_H^2]_{h1}$-$J_H$—$[CR_H^1R_H^2]_{h2}$-O—; unit ($R_{FHc}$): —O—$CF_2CHF$—$(CR_f^1R_f^2)_a$—O—$R_f$—O—$(CR_f^1R_f^2)_b$—$CFHCF_2$—O—$[CRHR_H^2]_{h1}$-$E_{HC}$-$R_{HC}$-$E_{HC}$-$[CR_H^1R_H^2]_{h2}$-O—;

wherein:

$R_f$ is either a divalent, linear or branched, fluoro(hydro)carbon chain, wherein said fluoro(hydro)carbon chain comprises from 1 to 10 carbon atoms and is optionally interrupted by one or more oxygen atoms; or is a group of formula: -$E_f$-$R_{cf}$-$E_f$-, with $E_f$, and $R_{cf}$ having the meaning defined above for compound ($F^c$);

$R_f^1$, $R_f^2$, a and b have the same meanings defined above for compound ($F^C$)

$J_H$ is either selected from a bond, a —O— group and a divalent linear or branched (oxy)alkylene group, wherein said (oxy)alkylene group comprises from 1 to 8 carbon atoms and is optionally interrupted by one or more than one ethereal oxygen atom; or is a group -$E_{HC}$-$R_{HC}$-$E_{HC}$-; and h1, h2, $E_{HC}$, $R_{HC}$, $R_H^1$ and $R_H^2$ have the same meanings defined above for compound ($H^C$).

The Applicant surprisingly found that the process according to the present invention allows to modulate the structure of the fluoropolyether polymers by introducing therein in a regular and recurrent manner units possessing cyclic moieties and hence endowed with increased structural stiffness, and reduced molecular mobility, and hence improving the physical and chemical properties thereof, and notably the stiffness (or the mobility) of the polymeric backbone.

In still a further aspect, the present invention relates to the use of at least one mixture (FH) as defined above, as an intermediate compound in the synthesis of other fluoropolyether derivatives.

DESCRIPTION OF EMBODIMENTS

For the purpose of the present description and of the following claims:

the use of parentheses around symbols or numbers identifying the formulae, for example in expressions like "unit ($R_{FcH}$)", etc., has the mere purpose of better distinguishing the symbol or number from the rest of the text and, hence, said parenthesis can also be omitted;

the term "(per)fluoropolyether" is intended to indicate polyether polymer(s) comprising a fully fluorinated or partially fluorinated backbone.

As said, in Step (1), at least compound (F) and at least one compound (H) are reacted; it may be possible to use a plurality of compounds (F) or a plurality of compounds (H), with the provision that at least one of compounds (F) is a "cyclic" compound, i.e. is a compound ($F^c$) as above detailed, and/or that at least one of compounds (H) is a "cyclic" compound, i.e. a compound ($H^c$) as above detailed.

Mixtures of cyclic and non-cyclic compounds (F) and (H) may be used. Compounds (F) which are not cyclic, i.e. which are different from compounds ($F^c$) will be referred hereunder as compounds ($F^{I\&b}$). Similarly, compounds (H) which are not cyclic, i.e. which are different from compounds ($H^c$) will be referred hereunder as compounds ($H^{I\&b}$).

In other terms, methods wherein in Step (1):
at least a compound ($F^c$) and at least a compound ($H^c$) are reacted;
at least a compound ($F^c$) and compound(s) (H) different from compound ($H^c$) [i.e. a compound ($H^{I\&b}$)] are reacted; and
compound(s) (F) different from compound ($F^c$) [i.e. a compound ($F^{I\&b}$)] and at least a compound ($H^c$) are reacted;
are all embodiments according to the present invention.

Nevertheless, preferred embodiments of the invention are those wherein at least one compound (H) is a compound ($H^c$) as described above, and said compound ($H^c$) is reacted with compounds ($F^{I\&b}$), as described above, that is to say that the method includes reacting a cyclic hydrogenated diol with a fluorinated non-cyclic bis-vinyl or bis-allyl ether derivative.

According to these embodiments, polymers of mixture (FH) have a backbone which preferably comprises (preferably consists essentially of) units ($R_{FHc}$), as detailed above, and more preferably of units ($R_{FHc}$), wherein $R_f$ is a divalent, perfluoro linear or branched (oxy)alkylene chain, wherein said alkylene chain comprises from 1 to 10 carbon atoms and is optionally interrupted by one or more oxygen atoms.

Preferably, said compound ($F^{I\&b}$) complies with the following formula:

$$CF_2=CF(CF_2)_zOR_{f1}O(CF_2)_{z*}CF=CF_2$$

wherein
each of z and z* is independently 0 or 1; and $R_f^1$ is a divalent, linear or branched, fluoro(hydro)carbon chain, wherein said fluoro(hydro)carbon chain comprises from 1 to 10 carbon atoms and is optionally interrupted by one or more oxygen atoms and is preferably a divalent perfluoro linear or branched (oxy)alkylene chain, wherein said alkylene chain comprise from 1 to 10 carbon atoms and is optionally interrupted by one or more than one oxygen atom.

Preferred compounds ($F^{I\&b}$) are those complying with the following formulae (F-I) to (F-VIII):

| | |
|---|---|
| $CF_2=CFO(CF_2)_2OCF=CF_2$ | (F-I) |
| $CF_2=CFO(CF_2)_3OCF=CF_2$ | (F-II) |
| $CF_2=CFO(CF_2)_4OCF=CF_2$ | (F-III) |
| $CF_2=CFCF_2O(CF_2)_4OCF_2CF=CF_2$ | (F-IV) |
| $CF_2=CFO-CF_2O-(CF_2)_2O(CF_2)_2O-CF_2O-CF=CF_2$ | (F-V) |
| $CF_2=CFO-CF_2O-(CF_2)_2O-CF_2O-CF=CF_2$ | (F-VI) |
| $CF_2=CFO-CF_2O-(CF_2)_3O-CF_2O-CF=CF_2$ | (F-VII) |
| $CF_2=CFO-CF_2O-(CF_2)_4O-CF_2O-CF=CF_2$ | (F-VIII) |
| $CF_2=CFO(CF_2)_2O(CF_2)_2OCF=CF_2$ | (F-IX) |

Accordingly, in units ($R_{FHc}$), moieties of formula: $-(CR_f^1R_f^2)_a-O-R_f-O-(CR_f^1R_f^2)_b$-derived from compounds ($F^{I\&b}$) are selected from the group consisting of:

| | |
|---|---|
| $-O(CF_2)_2O-$ | (Fu-I) |
| $-O(CF_2)_3O-$ | (Fu-II) |
| $-O(CF_2)_4O-$ | (Fu-III) |
| $-CF_2O(CF_2)_4OCF_2-$ | (Fu-IV) |
| $-O-CF_2O-(CF_2)_2O(CF_2)_2O-CF_2O-$ | (Fu-V) |
| $-O-CF_2O-(CF_2)_2O-CF_2O-$ | (Fu-VI) |
| $-O-CF_2O-(CF_2)_3O-CF_2O-$ | (Fu-VII) |
| $-O-CF_2O-(CF_2)_4O-CF_2O-$ | (Fu-VIII) |
| $-O(CF_2)_2O(CF_2)_2-$. | (Fu-IX) |

When a compound ($F^c$) is used, said compound (F) may be selected from the group consisting of aromatic and alicyclic compounds ($F^c$), i.e. comprising, respectively, aromatic cyclic moiety(ies) and aliphatic cyclic moiety(ies).

Among aromatic compounds ($F^c$), mention can be made of compounds of formula:

| | |
|---|---|
| $CF_2=CF-O-\phi-[Y-\phi]_y-O-CF=CF_2$ | ($F^c$-I) |
| $CF_2=CF-CF_2O-\phi-[Y-\phi]_y-O-CF_2-CF=CF_2$ | ($F^c$-II) | wherein:
each of Y, equal to or different from each other, is a bond, a group of any of formulae: $-O-$; $-C(CF_3)_2-$; $-C(CH_3)_2-$; $-SO_2-$; and $-C(O)-$;
each of y, equal to or different from each other, is 0 or an integer of 1 to 3; and
each of $\phi$ is a divalent benzene ring whereas the connecting bonds may be in ortho, meta or para position (preferably in para position), and may comprise fluorine atoms.

As mentioned above, compound (H) is hydrogenated, that is to say that hydrogen atoms saturate all free valences on carbon atoms of the same.

As said is preferred for compound (H) to include at least one compound ($H^c$): embodiments whereas all compounds (H) are compounds ($H^c$) are generally preferred, although it may be also acceptable to use as compound (H) a mixture of at least one compound ($H^c$) and a non-cyclic compound (H), which will be referred hereunder as compound ($H^{I\&b}$).

Compounds ($H^c$) may be selected from the group consisting of alicyclic compounds and aromatic compounds.

Among alicyclic compounds ($H^c$), preferred are compounds of formula:

$$HO-[CR_H^1R_H^2]_{h1}-R_{aliHC}-[CR_H^1R_H^2]_{h2}-OH,$$

wherein $R_H^1$ h1, h2 and $R_H^2$ have the meaning described above, and $R_{aliHC}$ is a divalent $C_5$-$C_{18}$ cycloaliphatic group, which is preferably selected from:
divalent cyclobutylene groups;
divalent cyclopentylene groups;
divalent cyclohexylene groups;
divalent norbornylene groups;
divalent bicyclo[4.4.0]decyl groups;
divalent spiro[5,4]decyl groups;
divalent spiro[5,5]undecyl groups.

Particularly preferred alicylic compounds (H$^c$) include notably:
1,2-cyclobutanediol;
1,3-cyclobutanediol;
2,2,4,4-tetramethyl-1,3-cyclobutanediol;
1,1-cyclobutanedimethanol
cis- and trans-1,2-cyclohexanediol;
1,4-cyclohexanediol;
cis- and trans-1,3-cyclohexanediol;
1,4-cyclohexanedimethanol;
4-methyl-1,2-cyclohexanedimethanol.

Among aromatic compounds (H$^c$), preferred are compounds of formula:

HO—[CR$_H^1$R$_H^2$]$_{h1}$-R$_{aromHC}$—[CR$_H^1$R$_H^2$]$_{h2}$-OH, wherein R$_H^1$ h1, h2 and R$_H^2$ have the meaning described above, and R$_{aromHC}$ is a divalent C$_6$-C$_{18}$ cycloaromatic group, which is preferably selected from:
divalent phenyl groups;
divalent aromatic groups of formula —Ar$_1$—[W$_{Ar}$—Ar$_2$]$_{nar}$-, wherein each of Ar$_1$ and Ar$_2$ are divalent aromatic groups, W$_{Ar}$ is a bond or is a group of any of formula —O—, —C(CH$_3$)$_2$-, —SO$_2$—; —C(O)—; and nar is zero or an integer of 1 to 3, preferably is zero or 1.

Particularly preferred aromatic compounds (H$^c$) include notably:
bis-phenol-A of formula HO-Ph$^{para}$-C(CH$_3$)$_2$-Ph$^{para}$-OH;
bis-phenol S of formula HO-Ph$^{para}$-SO$_2$-Ph$^{para}$-OH;
bis-phenol of formula HO-Ph$^{para}$-C(O)-Ph$^{para}$-OH;
1,4-diphenol of formula: HO-Ph$^{para}$-Ph$^{para}$-OH; and
1,4-benzenedimethanol of formula HO—CH$_2$-Ph$^{para}$-CH$_2$—OH;
wherein Ph$^{para}$ stands for a divalent para-phenylene group.

Accordingly, polymers of mixture (FH) have a backbone which preferably comprises (preferably consists essentially of) units (R$_{FHc}$), as detailed above, and more preferably of units (R$_{FHc}$), wherein moiety —[CR$_H^1$R$_H^2$]$_{h1}$-E$_{HC}$-R$_{HC}$-E$_{HC}$-[CR$_H^1$R$_H^2$]$_{h2}$-is a group of formula —[CR$_H^1$R$_H^2$]$_{h1}$-R$_{aliHC}$—[CR$_H^1$R$_H^2$]$_{h2}$-, or of formula —[CR$_H^1$R$_H^2$]$_{h1}$-R$_{aromHC}$—[CR$_H^1$R$_H^2$]$_{h2}$-, as described above.

Accordingly, polymers of mixture (FH) have a backbone which more preferably comprises (preferably consists essentially of) units (R$_{FHc}$), as detailed above, and more preferably of units (R$_{FHc}$), wherein:
(i) moiety —[CR$_H^1$R$_H^2$]$_{h1}$-R$_{aliHC}$—[CR$_H^1$R$_H^2$]$_{h2}$-is a group selected from the group consisting of:
1,2-cyclobutylene;
1,3-cyclobutylene;
2,2,4,4-tetramethyl-1,3-cyclobutylene;
1,1-cyclobutanedimethylene;
cis- and trans-1,2-cyclohexylene;
1,4-cyclohexylene;
cis- and trans-1,3-cyclohexylene;
1,4-cyclohexanedimethylene;
4-methyl-1,2-cyclohexanedimethylene; and
(ii) moiety —[CR$_H^1$R$_H^2$]$_{h1}$-R$_{aromHC}$—[CR$_H^1$R$_H^2$]$_{h2}$-is a group selected from the group consisting of:
Ph$^{para}$-C(CH$_3$)$_2$-Ph$^{para}$-;
Ph$^{para}$-SO$_2$-Ph$^{para}$-;
Ph$^{para}$-C(O)-Ph$^{para}$-;
Ph$^{para}$-Ph$^{para}$-; and
CH$_2$-Ph$^{para}$-CH$_2$—;
wherein Ph$^{para}$ stands for a divalent para-phenylene group.

When present, preferably, said compound (H$^{I\&b}$) is a compound of formula:

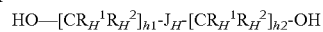

HO—[CR$_H^1$R$_H^2$]$_{h1}$-J$_H$-[CR$_H^1$R$_H^2$]$_{h2}$-OH wherein J$_H$ is selected from a bond, a —O— group and a divalent linear or branched (oxy)alkylene group, wherein said (oxy)alkylene group comprises from 1 to 8 carbon atoms and is optionally interrupted by one or more than one ethereal oxygen atom;
each of R$_H^1$ and R$_H^2$, equal to or different from each other at each occurrence, is independently H or a C$_1$-C$_6$ hydrocarbon group.

More preferably, said (oxy)alkylene group of E$_H$ is linear (oxy)alkylene group, i.e. a group consisting of a sequence of —CH$_2$—, possibly including one or more than one ethereal oxygen —O—.

More preferably, said (oxy)alkylene group comprises from 1 to 10 carbon atoms, even more preferably from 1 to 6 carbon atoms, and still more preferably from 1 to 4 carbon atoms.

In all formulae above for compound (H), more preferably, each of R$_H^1$ and R$_H^2$, equal to or different from each other at each occurrence, is independently H or a C$_1$-C$_3$ alkyl group; more preferably H or —CH$_3$; most preferably, is H.

Preferably, said compound (H$^{I\&b}$) is selected from the group consisting of:
(H$^{I\&b}$-j) HO—(CH$_2$)$_2$—OH,
(H$^{I\&b}$-jj) HO—(CH$_2$)$_3$—OH,
(H$^{I\&b}$-jjj) HO—(CH$_2$)$_4$—OH,
(H$^{I\&b}$-jv) HO—(CH$_2$)$_5$—OH, and
(H$^{I\&b}$-v) HO—(CH$_2$)$_2$—O—(CH$_2$)$_2$—OH.

Preferably, Step (I) is performed under heating, such as for example at a temperature of from 30° C. to 150° C., preferably from 30° C. to 80° C.

Preferably, Step (I) is performed in the presence of a base. Suitable bases are selected in the group comprising NaOH, KOH, NH$_4$OH, NaH, trialkylamines, guanidines such as notably tetramethyl guanidine, and 1,4-diazabicyclo[2.2.2]octane ("DABCO").

Optionally, Step (I) is performed in the presence of a solvent, said solvent being preferably selected in the group comprising, more preferably consisting of, at least one polar aprotic solvent or at least one hydrofluoroether (HFE).

Preferably, said polar aprotic solvent is selected in the group comprising, more preferably consisting of, compounds bearing two hydroxy groups, dimethoxyethane (glyme), bis(2-methoxyethyl) ether (di-glyme), triethylene glycol dimethyl ether (tri-glyme), tetraethylene glycol dimethyl ether (tetraglyme), tetrahydrofuran, acetonitrile, dimethyl sulfoxide, dimethylformamide, ethylene polyoxides dimethylethers. Acetonitrile being particularly preferred.

Step (1) is preferably performed by adding said compound (F) to said compound (H), although embodiments whereas a reverse addition order is performed may be equally effective.

Reactivity of compound (F) in Step (1) is advantageously monitored by a suitable analytical technique enabling determining disappearance of C═C unsaturation; NMR may be used, although other technique could be equally effective for determining conditions whereas conversion of compound (F) is substantially quantitative, that is to say that no residual C═C carbon bond is detected when submitting mixture (P$^{FH}_{OH-OH}$) to such analytical determination.

Depending on the molar ratio of compound (F) and of compound (H) used in Step (1), polymer(s) of mixture (FH) is(are) obtained comprising at their chain ends two allyl or vinyl groups, two hydroxy groups or one hydroxy and one allyl or vinyl group.

Mixture (FH) is hence a mixture of polymers of any of formulae below:

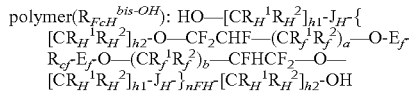

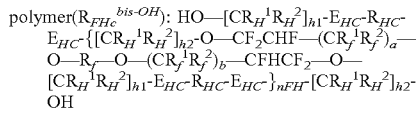

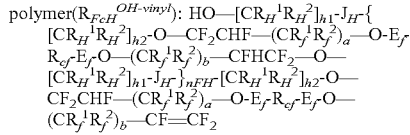

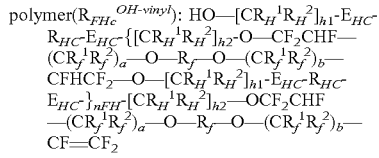

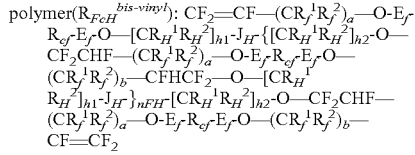

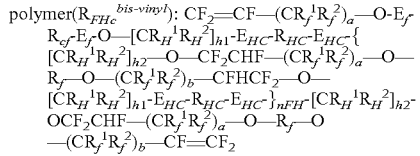

wherein in formulae above nFH is an integer of 1 or more, and preferably is an integer such that the number averaged molecular weight of polymers of mixture (FH) is of 300 to 50,000, preferably of 400 to 40,000, more preferably of 500 to 25,000;

and wherein $R_f^1$, $R_f^2$, $E_f$, $R_{cf}$, $R_f$, $J_H$, $E_{HC}$, $R_{HC}$, $R_H^1$, $R_H^2$, h1, h2, a, and b have the meaning described above.

More in particular, when the molar ratio between compound (F) and compound (H) is higher than 1, i.e. when compound (F) is used in molar excess compared to compound (H), mixture (FH) comprising a majority of polymers which have at their chain ends two allyl or vinyl groups is preferably obtained, that is to say a majority of polymers ($R_{FcH}^{bis-vinyl}$), and polymers ($R_{FHc}^{bis-vinyl}$), as defined above, and more preferably a majority of polymers ($R_{FHc}^{bis-vinyl}$), as defined above.

Preferably, when the molar ratio between compound (F) and compound (H) is lower than 1, i.e. when compound (H) is used in molar excess compared to compound (F), mixture (FH) comprising a majority of polymers which have at their chain ends two hydroxy groups is preferably obtained, that is to say a majority of polymers ($R_{FcH}^{bis-OH}$) and polymers ($R_{FHc}^{bis-OH}$), and more preferably a majority of polymers ($R_{FHc}^{bis-OH}$).

Also, when the molar ratio between compound (F) and compound (H) is about 1, i.e. when a stoichiometric amount of compound (F) and of compound (H) are used, mixture (FH) comprising a majority of polymers which have at one chain end a hydroxy group and at the other chain end an allyl or vinyl group is preferably obtained, that is to say a majority of polymers ($R_{FcH}^{OH-vinyl}$) and polymers ($R_{FHc}^{OH-vinyl}$), and more preferably a majority of polymers ($R_{FHc}^{OH-vinyl}$).

Mixture (FH) may be submitted to work-up procedures at the end of Step (1), including, for instance, removal of solvent, removal of possible undesired side-products, etc.

In particular, according to certain embodiments, polymers ($R_{FcH}^{bis-OH}$) and polymers ($R_{FHc}^{bis-OH}$) of mixture (FH) may be separated from polymers ($R_{FcH}^{OH-vinyl}$), polymers ($R_{FHc}^{OH-vinyl}$), polymers ($R_{FcH}^{bis-vinyl}$), and polymers ($R_{FHc}^{bis-vinyl}$), such separation being achieved through well-known separation technologies, including distillation/fractionation, absorption/elution, and the like.

Similarly, said separation techniques may be used for isolating polymers ($R_{FcH}^{OH-vinyl}$), and polymers ($R_{FHc}^{OH-vinyl}$), of for isolating polymers ($R_{FcH}^{bis-vinyl}$), and polymers ($R_{FHc}^{bis-vinyl}$).

It is nevertheless understood that embodiments wherein components of mixture (FH) are not separated and removed are not detrimentally affecting further reactivity in subsequent steps.

According to certain embodiments, the method (FH) comprises a Step (3) of contacting mixture (FH) with a source of molecular fluorine to effect fluorination of polymers of mixture (FH).

While fluorinating a mixture (FH), whose constituting polymers comprise heteroatoms such as N or S in the backbone, is possible, such fluorination may give rise to side reactions whereas these N or S atoms may modify their connections to the backbone. So, it is generally understood that it would be generally preferred to submit to fluorination mixtures (FH) as above detailed, but wherein no heteroatom N or S is comprised in the structure of its constituting polymers.

Further, while fluorinating a mixture (FH), whose constituting polymers comprise aromatic moieties in the backbone, is possible, such fluorination may give rise to corresponding fluorinated counterparts whereas the aromatic character of the aromatic moiety of the polymers of mixture (FH) may be lost. For instance, extensive fluorination of an aromatic moiety may give rise to corresponding saturated and fully fluorinated structure, or may give rise, depending on conditions, to other forms of saturated or unsaturated cyclic or non-cyclic moieties. So, it is generally understood that it would be generally preferred to submit to fluorination mixtures (FH) as above detailed, but wherein no aromatic moiety is comprised in the structure of its constituting polymers.

The choice of the source of molecular fluorine is not critical. Preferably, said source of molecular fluorine is a gas containing fluorine. While embodiments whereas the said source of molecular fluorine is neat fluorine gas ($F_2$) are foreseen, it is generally understood that techniques whereas use is made of a diluted gaseous mixture of fluorine and an inert gas can be equally practiced, and may have advantages.

Fluorine gas may be admixed with nitrogen, argon, helium. Advantageously, according to certain embodiments, a halogenated olefin can be added in order to generate fluorine radicals to assist the fluorination Step (3). Said halogenated olefin can be selected for example from tetrafluoroethylene (TFE), hexafluoro-propylene (HFP), octafluorobutene, perfluoropentene, perfluorohexene, perfluoroheptene, perfluoroctene, perfluorocyclobutene, perfluorocyclopentene, perfluorocyclohexene, chlorotrifluoroethylene (CTFE), dichlorodifluoroethylene, chloropentafluoropropene, perfluorobuta-diene, perfluoromethylvinylether, perfluoro-ethylvinylether, perfluoro-propylvinylether; $CF_3OCIC=CCIF$, trichloroethylene, tetrachloroethylene, dichloroethylene isomers; and fluorodioxoles.

Preferably, Step (3) is performed at a temperature of from −50° C. to 80° C., preferably from −20° C. to 75° C., more preferably from 0° C. to 60° C., most preferably from 20° C. to 50° C.

The result of Step (3) is a mixture [mixture (FF)] of polymers comprising a fully fluorinated polyether backbone possessing a plurality of recurring units including at least one cyclic group; and said backbone comprises recurring units selected from the group consisting of units ($R_{FcF}$) and units ($R_{FFc}$):

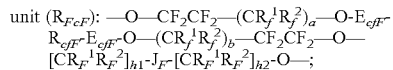

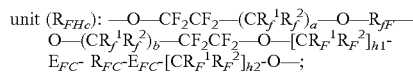

wherein:
$R_f^1$, $R_f^2$, $E_f$, h1, h2, $R_{cf}$, a and b have the same meanings defined above;

$R_{fF}$ is either a divalent, linear or branched, perfluorocarbon chain, wherein said perfluorocarbon chain comprises from 1 to 10 carbon atoms and is optionally interrupted by one or more oxygen atoms; or is a group of formula: $-E_{fF}-R_{cfF}-E_{fF}-$;

$R_{cfF}$ is a divalent perfluorocarbon cyclic group, which may be a perfluorocycloaliphatic, which may comprise one or more than one cyclic moiety, and which may comprise one or more than one oxygen atom included in the cycle;

each of $E_{fF}$, equal to or different from each other, is a bond, or a divalent perfluorocarbon group, possibly comprising one or more than one heteroatoms selected from Cl, and O;

$J_F$ is either selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom; or is a group $-E_{FC}-R_{FC}-E_{FC}-$;

each of $E_{FC}$ is selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom;

$R_{FC}$ is divalent perfluorocarbon cyclic group, which may be a perfluorocycloaliphatic, which may comprise one or more than one cyclic moiety, and which may comprise one or more than one oxygen atom included in the cycle;

h1 and h2 being independently zero or 1, preferably being equal to each other, and being collectively zero or 1;

each of $R_F^1$ and $R_F^2$, equal to or different from each other at each occurrence, is independently F or a $C_1$-$C_6$ perfluorocarbon group.

When the method of the invention includes a fluorination step, it may be advantageous to include an additional Step (2), in which end groups of hydroxyl-type are protected, for avoiding decomposition into $COF_2$ of terminal carbon bearing originally a —OH group.

Hence a Step (2) is particularly advantageous when the mixture (FH) comprises any of polymers ($R_{FcH}^{bis-OH}$), polymers ($R_{FHc}^{bis-OH}$), polymers ($R_{FcH}^{OH-vinyl}$), and polymers ($R_{FHc}^{OH-vinyl}$). Generally, Step (2) is a step of converting hydroxyl groups of formula: $HO-[CR_H^1R_H^2]_{h1}$- and/or $-[CR_H^1R_H^2]_{h2}$-OH into corresponding fluoroformate groups of formula $F-C(O)-O-[CR_H^1R_H^2]_{h1}$- and/or formula $-[CR_H^1R_H^2]_{h2}-O-C(O)-F$.

In Step (2), mixture (FH) is generally reacted with $COF_2$. Generally, reaction conditions are adapted to enable a gaseous amount of $COF_2$ to contact mixture (FH). Reaction may be carried out substantially under atmospheric pressure or slight overpressure, by bubbling a gaseous flow of $COF_2$ through a reaction medium comprising mixture (FH) and enabling excess $COF_2$ to escape the reaction medium. According to other embodiments, reaction may be carried out under pressure, feeding in a closed reactor a given amount of $COF_2$, and maintaining overpressure until completion of Step (2).

Carbonyl fluoride may be generated 'on-line', and/or prior to be used, by reaction of carbon monoxide with molecular fluorine.

Step (2) may be carried out in the presence of a solvent. When a solvent is used, it is generally preferred to employ a per (halo)fluorinated solvent, which is stable under fluorination conditions.

Examples thereof are notably per (halo)fluorocarbon compounds, possibly comprising heteroatoms such as O, S, and N; a particularly effective solvent is 1,2,3,4-tetrachlorohexafluorobutane.

Preferably, Step (2) is performed at moderated temperature, that is to say, at temperatures of no more than 80° C., preferably no more than 70° C., even more preferably no more than 50° C. Effectiveness of conversion of hydroxyl groups into fluoroformate groups is already achieved when operating at temperatures of below 35° C.; generally temperatures exceeding 0° C., preferably exceeding 5° C., more preferably exceeding 10° C. will be preferred.

As said, Step (2) leads to a mixture ($FH_{OC(O)F}$) of polymers of any of formulae below:

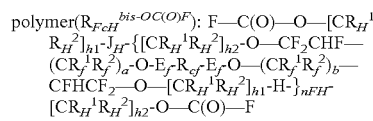

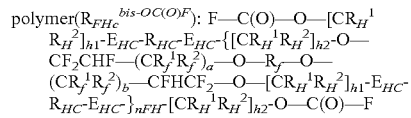

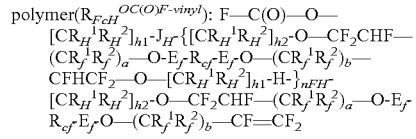

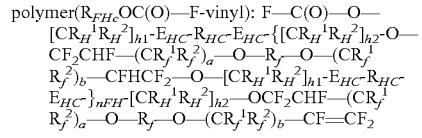

polymer ($R_{FcH}^{bis-vinyl}$), as above detailed;
polymer ($R_{FHc}^{bis-vinyl}$), as above detailed;
wherein in formulae above nFH is an integer of 1 or more, and preferably is an integer such that the number averaged molecular weight of polymers of mixture (FH) is of 300 to 50,000, preferably of 400 to 40,000, more preferably of 500 to 25,000;

and wherein $R_f^1$, $R_f^2$, $E_f$, $R_{cf}$, $R_f$, $J_H$, $E_{HC}$, $R_{HC}$, $R_H^1$, $R_H^2$, h1, h2, a, and b have the meaning described above.

Conversion of polymers ($R_{FcH}^{bis-OH}$), polymers ($R_{FHc}^{bis-OH}$), polymers ($R_{FcH}^{OH-vinyl}$), and polymers ($R_{FHc}^{OH-vinyl}$) into polymers ($R_{FcH}^{bis-OC(O)F}$), polymer ($R_{FHc}^{bis-OC(O)F}$), polymer ($R_{FcH}^{OC(O)F-vinyl}$), and polymer ($R_{FHc}^{OC(O)-F-vinyl}$) can be monitored by suitable analytical techniques. According to preferred embodiments, substantially all hydroxyl groups of polymers ($R_{FcH}^{bis-OH}$), polymers ($R_{FHc}^{bis-OH}$), polymers ($R_{FcH}^{OH-vinyl}$), and polymers ($R_{FHc}^{OH-vinyl}$), as above detailed, are converted into fluoroformate groups: in other terms, mixture ($FH_{OC(O)F}$) comprises no detectable amount of any of polymers ($R_{FcH}^{bis-OH}$), polymers ($R_{FHc}^{bis-OH}$), polymers ($R_{FcH}^{OH-vinyl}$), and polymers ($R_{FHc}^{OH-vinyl}$), as above detailed.

Under fluorination conditions, fluoroformate groups advantageously do not undergo any significant decomposition/side-reaction, while essentially exhaustive fluorination is achieved for aliphatic C—H bonds, which are transformed into C—F bonds.

When the method of the invention includes a Step (2) and a Step (3), as above detailed, the result of the said Step (3) is a mixture ($FF^{-OC(O)F}$) is hence a mixture of polymers of any of formulae below:

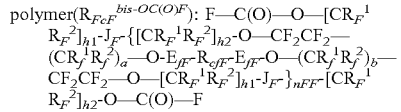

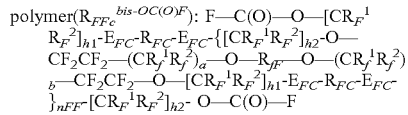

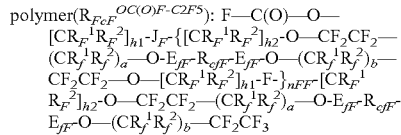

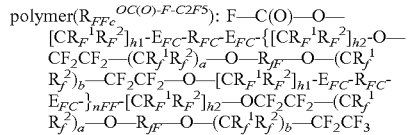

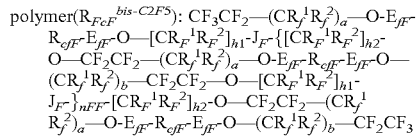

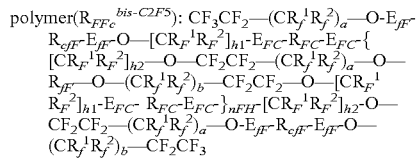

wherein in formulae above nFF is an integer of 1 or more, and preferably is an integer such that the number averaged molecular weight of polymers of mixture (FF) is of 300 to 50,000, preferably of 400 to 40,000, more preferably of 500 to 25,000;

and wherein $R_f^1$, $R_f^2$, $E_{fF}$, $R_{cfF}$, $R_{fF}$, $J_F$, $E_{FC}$, $R_{FC}$, $R_F^1$, $R_F^2$, h1, h2, a, and b have the meaning described above.

According to certain embodiments, mixture ($FF^{-OC(O)F}$):

may be a mixture comprising a major amount of polymers ($R_{FcF}^{bis-OC(O)F}$) and polymers ($R_{FFc}^{bis-OC(O)F}$), preferably of polymers ($R_{FcF}^{bis-OC(O)F}$), as detailed above;

may be a mixture comprising a major amount of polymers ($R_{FcF}^{OC(O)F-C2F5}$) and polymers ($R_{FFc}^{OC(O)-F-C2F5}$), preferably of polymers ($R_{FcF}^{OC(O)F-C2F5}$), as detailed above;

may be a mixture comprising a major amount of polymers ($R_{FcF}^{bis-C2F5}$) and polymers ($R_{FHc}^{bis-C2F5}$), preferably of polymers ($R_{FcF}^{bis-C2F5}$), as detailed above.

Said polymers of mixture ($FF^{-OC(O)F}$) including a fluoroformate group may be further reacted in a subsequent step (Step (4)) of the method of the present invention.

A step of isolating polymers having one or more than one fluoroformate group in mixture ($FF^{-OC(O)F}$) may be carried out before Step (4).

Step (4), after Step (3), wherein said Step (4) comprises reacting polymers having one or more than one fluoroformate group to provide corresponding polymers having one or more than one carboxylic acid groups of formula —COOH and/or ester group of formula —C(=O)O—$R_{alk}$ wherein $R_{alk}$ is a linear or branched alkyl chain comprising from 1 to 10 carbon atoms.

In Step (4), first mixture ($FF^{-OC(O)F}$) including polymers having one or more than one fluoroformate group is submitted to hydrolysis conditions in the presence of water. While liquid water may be added to mixture ($FF^{-OC(O)F}$) for effecting hydrolysis of fluoroformate groups, it is generally understood that a flow of moisturized gas, e.g. moisturized air, with relative humidity (RH) of at least 50%, could be an effective vehicle for contacting mixture ($FF^{-OC(O)F}$) with water. In this first part of Step (4), upon exposure to water, polymer ($R_{FcF}^{bis-OC(O)F}$), polymers ($R_{FFc}^{bis-OC(O)F}$), polymers ($R_{FcF}^{OC(O)F-C2F5}$) and polymers ($R_{FFc}^{OC(O)-FC2F5}$), possessing fluoroformate end groups, are advantageously decomposed through decarboxylation and dehydrofluorination, and are transformed into carboxylic acid-derivatives, hence "losing" a carbon atom per fluoroformate group. Conversion of fluoroformate end groups is substantially quantitative, and progress of the reaction can be monitored through appropriate analytical technique.

The result of the said Step (4) is a mixture ($FF^{-COOH}$) is hence a mixture of polymers of any of formulae below:

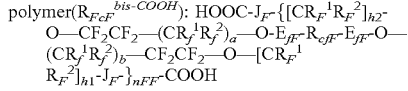

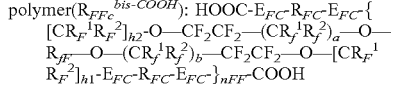

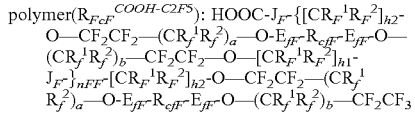

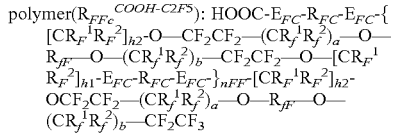

polymer ($R_{FcF}^{bis-C2F5}$), as detailed above;
polymer ($R_{FFc}^{bis-C2F5}$), as detailed above;
wherein in formulae above nFF is an integer of 1 or more, and preferably is an integer such that the number averaged molecular weight of polymers of mixture (FF) is of 300 to 50,000, preferably of 400 to 40,000, more preferably of 500 to 25,000;

and wherein $R_f^1$, $R_f^2$, $E_{fF}$, $R_{cfF}$, $R_{fF}$, $J_F$, $E_{FC}$, $R_{FC}$, $R_F^1$, $R_F^2$, h1, h2, a, and b have the meaning described above.

Preferably, Step (4) further comprises a step of contacting polymers of mixture (FF$^{-OC(O)F}$) under hydrolysis conditions, as above detailed, with at least one compound of formula $R_{alk}$—OH, wherein $R_{alk}$ is a linear or branched alkyl chain comprising from 1 to 10 carbon atoms.

The result of the result of the said Step (4) is a mixture (FF$^{-ester}$) is hence a mixture of polymers of any of formulae below:

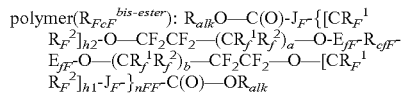

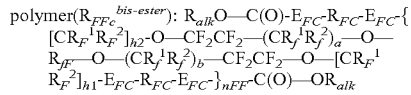

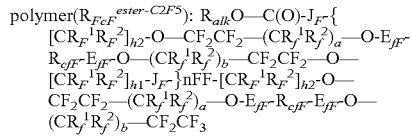

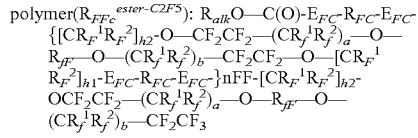

polymer ($R_{FcF}^{bis-C2F5}$), as detailed above; and
polymer ($R_{FFc}^{bis-C2F5}$), as detailed above.

wherein in formulae above nFF is an integer of 1 or more, and preferably is an integer such that the number averaged molecular weight of polymers of mixture (FF) is of 300 to 50,000, preferably of 400 to 40,000, more preferably of 500 to 25,000;

and wherein $R_{alk}$, nFF, $R_f^1$, $R_f^2$, $E_{fF}$, $R_{cfF}$, $R_{fF}$, $J_F$, $E_{FC}$, $R_{FC}$, $R_F^1$, $R_F^2$, h1, h2, a, and b have the meaning described above.

Any of mixture (FH), mixture (FH$^{-OC(O)F}$), mixture (FF$^{-OC(O)F}$), mixture (FF$^{-COOH}$), mixture (FF$^{-ester}$) may be used as intermediate for the synthesis of further derivatives.

Further, the method of the invention may include additional steps aimed at exploiting reactivity of —COOH of ester end groups of polymers of any of mixture (FF$^{-COOH}$), and mixture (FF$^{-ester}$). Notably, the said —COOH end groups may be salified and/or esterified to provide groups of formula —COOR$_a$, with R$_a$ being a monovalent metal; a group of formula NR$^N_4$, with R$^N$ being H or a C$_1$-C$_{12}$ hydrocarbon group; or a C$_1$-C$_{12}$ hydrocarbon group. Alternatively, said —COOH or —C(O)—OR$_{alk}$ end groups may be transformed into corresponding acyl halides groups of formula —COX, with X being F, Cl. Whichever type of chemistry may be further applied to those reactive carboxylic, carboxyl-derivative or carbonyl halide groups; in particular, said groups may be reacted with different reactants, e.g. as described in U.S. Pat. No. 3,810,874 (MINNESOTA MINING AND MANUFACTURING COMPANY) May 14, 1974.

Each —COOH or —C(O)—OR$_{alk}$ end group may be reacted into a group of formula —X$_a$YZ$_b$, wherein:

X a polyvalent, preferably divalent, linking organic radical, preferably selected from the group consisting of —CONR—, —COO—, —COS—, —CO—, and groups of any of formulae:

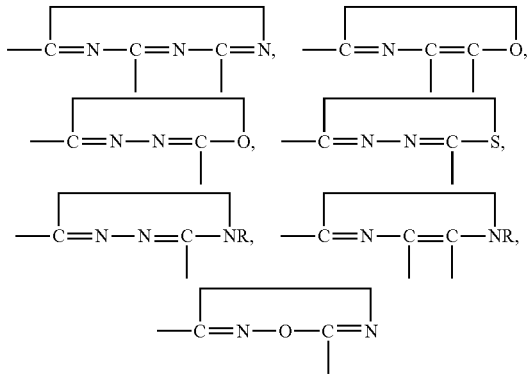

a is zero or one;
b is an integer of 1-3;
R is hydrogen, (e.g., CH$_3$, —CH$_2$CF$_3$, —C$_6$H$_{13}$), aryl of less than 13 carbon atoms (e.g., —C$_6$H$_5$, —C$_6$H$_4$CH$_3$) or —YZ$_b$ radical;
Y is a bond or a polyvalent linking organic radicals free of olefinic unsaturation such as alkylene (e.g., —CH$_2$—, —C$_2$H$_4$-), oxa-alkylene (e.g., —CH$_2$OCH$_2$—), cycloalkylene (e.g. -c-C$_6$H$_{10}$-), thia-alkylene (e.g., —CH$_2$SCH$_2$—), arylene (e.g. —C$_6$H$_4$-), or combinations thereof, such as aralkylene and alkarylene;
Z is a functional groups which may notably undergo electrophilic, nucleophilic, or free radical reaction, and which can be notably selected from the group consisting of —OH, —SH, —SR', —NR$_2$', —CO$_2$H, —SiR'$_d$Q$_{3-d}$, —CN, —NCO, >C=C<, —CO$_2$R', —OSO$_2$CF$_3$, —OCOCl, —OCN, —N(R')CN, —(O)COC(O)—, —N=C, —I, —CHO, —CH(OCH$_3$)$_2$, —SO$_2$Cl, —C(OCH$_3$)=NH, —C(NH$_2$)=NH, —C$_6$H$_4$OC$_6$H$_4$-Q, —OCR$_1$R$_2$R$_f$,

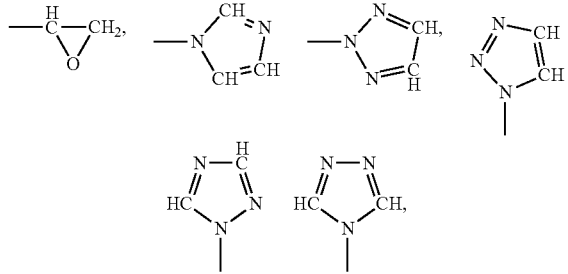

wherein R' is hydrogen, aryl, or a C$_1$-C$_6$ alkyl; Q is halogen, —OR', —OCOR', or —CH=CH$_2$; and d is or an integer of 1 to 3; R$_1$ is hydrogen, or a C$_1$-C$_6$ (fluoro)alkyl, R$_2$ is hydrogen, or a C$_1$-C$_6$ alkyl; and R$_f$ is a C$_1$-C$_6$ (fluoro)alkyl.

The present invention also relates to the use of mixture (FH), mixture (FH$^{-OC(O)F}$), mixture (FF$^{-OC(O)F}$), mixture (FF$^{-COOH}$), mixture (FF$^{-ester}$) or any derivative thereof as lubricants, notably for magnetic recording media (MRM).

Should the disclosure of any patents, patent applications, and publications which are incorporated herein by reference conflict with the description of the present application to the extent that it may render a term unclear, the present description shall take precedence.

Should the disclosure of any patents, patent applications, and publications which are incorporated herein by reference conflict with the description of the present application to the extent that it may render a term unclear, the present description shall take precedence.

The invention will be herein after illustrated in greater detail by means of the Examples contained in the following Experimental Section; the Examples are merely illustrative and are by no means to be interpreted as limiting the scope of the invention

EXPERIMENTAL SECTION

Example 1—Synthesis of HO[Ph-C(CF$_3$)$_2$-PhOCF$_2$CFHO(CF$_2$)$_3$OCFHCF$_2$O]$_n$Ph-C(CF$_3$)$_2$-PhOH A three neck round bottom flask with magnetic stirring, temperature probe and reflux condenser was charged with 0.53 g of NaOH, 40 ml of Acetonitrile and 19.47 g of Bisphenol AF (HO-PhC(CF$_3$)$_2$Ph-OH). The mixture was heated at 40° C. under stirring till complete dissolution of sodium hydroxide. Then 11.03 g of CF$_2$=CF—O(CF$_2$)$_3$O—CF=CF$_2$ was added dropwise. The resulting mixture was held at 50° C. under stirring for ten hours, till complete conversion of perfluoro bisvinylether. Acetonitrile was evaporated at 60° C. under vacuum obtaining a white solid that was washed at 65° C. for three time with 35 ml of a solution methanol/water (1/1 weight). The resulting mixture was left to separate for one night, then the white solid was separated, dissolved in CH$_2$Cl$_2$, treated with anhydrous Na$_2$SO$_4$, filtered and solvent was evaporated under reduced pressure to obtain 22.72 g of a mixture analyzed through GPC (polydispersity=1.55). LC with a UV detector (254 nm) that identified [ ]n between 1 and 9.

Example 2—Synthesis of HO[CH$_2$PhCH$_2$OCF$_2$CFHO(CF$_2$)$_3$OCFHCF$_2$O]$_n$CH$_2$PhCH$_2$OH A three neck round bottom flask with magnetic stirring, temperature probe and reflux condenser was charged with 6.87 g of NaOH, 21.56 g of 1,4-benzenedimethanol and 200 ml of acetonitrile. The mixture was heated at 90° C. under stirring for three hours and then 50 g of CF$_2$=CFO(CF$_2$)$_3$OCF=CF$_2$ were added dropwise. The resulting mixture was held at 90° C. under stirring till complete conversion of perfluoro-bis-vinylether. The crude was centrifuged and the clear solution transferred in a distillation apparatus where solvent was completely evaporated to obtain a viscous liquid that was dissolved in dichloromethane. The resulting solution was then washed three times with HCl 5%, the organic layer was separated, treated with anhydrous Na$_2$SO$_4$, filtered and solvent was evaporated under reduced pressure to obtain 67 g of a mixture analyzed through LC with a UV detector (254 nm) that identified [ ]n between 1 and 5.

Example 3—Synthesis of HO[CH$_2$—Cy-CH$_2$OCF$_2$CFHO(CF$_2$)$_3$OCFHCF$_2$O]$_n$CH$_2$—Cy-CH$_2$OH A three neck round bottom flask with magnetic stirring, temperature probe and reflux condenser was charged with 9.06 g of NaOH, 22.83 g of 1,4-cyclohexanedimethanol and 200 ml of acetonitrile. The mixture was heated at 95° C. under stirring for three hours and then 50 g of CF$_2$=CFO(CF$_2$)$_3$OCF=CF$_2$ were added dropwise. The resulting mixture was held at 95° C. under stirring till complete conversion of perfluoro-bis-vinylether. The crude was centrifuged and the clear solution transferred in a distillation apparatus where solvent was completely evaporated to obtain a viscous liquid that was dissolved in dichloromethane. The resulting solution was then washed three times with HCl 5%, the organic layer was separated, treated with anhydrous Na$_2$SO$_4$, filtered and solvent was evaporated under reduced pressure to obtain 52.5 g of a mixture analyzed through UPLC/MS (LCQ) that identified [ ]n between 1 and 5.

The invention claimed is:

1. A method (method (M$_{FH}$)) for the synthesis of a mixture of polymers comprising a partially fluorinated polyether backbone possessing a plurality of recurring units including at least one cyclic group and having two chain ends, wherein said chain ends comprise at least one group selected from hydroxy group, allyl group and vinyl group, said method comprising the step of:

Step (1): a step of reacting:
(1a) at least one fluorinated compound (compound (F)) comprising at least two unsaturated groups selected from vinyl groups and allyl groups, and
(1b) at least one fully or partially hydrogenated compound (compound (H)) comprising at least two hydroxy groups,
to provide a mixture (FH), wherein:
(i) at least one compound (F) is a compound (F$^c$) of formula:

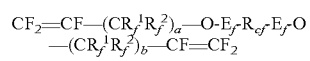

$$CF_2=CF—(CR_f^1R_f^2)_a—O-E_f-R_{cf}-E_f-O—(CR_f^1R_f^2)_b—CF=CF_2$$

wherein:
R$_{cf}$ is a divalent fluorocarbon cyclic group, which may be a cycloaliphatic or a cycloaromatic group, which may comprise one or more than one cyclic moiety, and which may comprise one or more than one heteroatom included in the cycle, said heteroatom being selected from N, O and S;
each of E$_f$, equal to or different from each other, is a bond, or a divalent fluorocarbon group, possibly comprising one or more than one heteroatoms selected from Cl, N, O and S;
each or R$_f^1$ and R$_f^2$, equal to or different from each other, is F or a C$_1$-C$_6$ perfluorocarbon group;
a and b being independently zero or 1; and
(ii) at least one compound (H) is a compound (H$^c$) of formula:

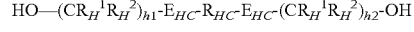

$$HO—(CR_H^1R_H^2)_{h1}-E_{HC}-R_{HC}-E_{HC}-(CR_H^1R_H^2)_{h2}-OH$$

wherein:
each of E$_{HC}$ is selected from a bond, a —O— group and a divalent linear or branched (oxy)alkylene group, wherein said (oxy)alkylene group comprises from 1 to 8 carbon atoms and is optionally interrupted by one or more than one ethereal oxygen atom;
R$_{HC}$ is divalent hydrocarbon cyclic group, which may be a cycloaliphatic or a cycloaromatic group, which may comprise one or more than one cyclic moiety, and which may comprise one or more than one heteroatom included in the cycle, said heteroatom being selected from N, O and S;
h1 and h2 being independently zero or 1;
each of R$_H^1$ and R$_H^2$, equal to or different from each other at each occurrence, is independently H or a C$_1$-C$_6$ hydrocarbon group.

2. The method of claim 1, wherein mixture (FH) is a mixture of polymers comprising a partially fluorinated polyether backbone possessing a plurality of recurring units including at least one cyclic group and having two chain ends, wherein each of said chain ends comprises a group selected from hydroxy group, allyl group or vinyl group; and
said backbone comprises recurring units selected from the group consisting of units ($R_{FcH}$) and units ($R_{FHc}$):
unit ($R_{FcH}$): —O—$CF_2CHF$—$(CR_f^1R_f^2)_a$—O-$E_{cf}$-$R_{cf}$-$E_{cf}$-O—$(CR_f^1R_f^2)_b$—$CFHCF_2$—O—$(CR_H^1R_H^2)_{h1}$-$J_H$-$(CR_H^1R_H^2)_{h2}$-O—;
unit ($R_{FHc}$):
—O—$CF_2CHF$—$(CR_f^1R_f^2)_a$—O—$R_f$—O—$(CR_f^1R_f^2)_b$—$CFHCF_2$—O—$(CR_H^1R_H^2)_{h1}$-$E_{HC}$-$R_{HC}$-$E_{HC}$-$(CR_H^1R_H^2)_{h2}$-O—;
wherein:
$R_f$ is either a divalent, linear or branched, fluoro(hydro)carbon chain, wherein said fluoro(hydro)carbon chain comprises from 1 to 10 carbon atoms and is optionally interrupted by one or more oxygen atoms; or is a group of formula: -$E_f$-$R_{cf}$-$E_f$-, with $E_f$ and $R_{cf}$ having the meaning defined in claim 1 for compound ($F^C$);
$R_f^1$, $R_f^2$, a and b have the same meanings defined in claim 1 for compound ($F^C$)
$J_H$ is either selected from a bond, a —O— group and a divalent linear or branched (oxy)alkylene group, wherein said (oxy)alkylene group comprises from 1 to 8 carbon atoms and is optionally interrupted by one or more than one ethereal oxygen atom; or is a group -$E_{HC}$-$R_{HC}$-$E_{HC}$-; and
h1, h2, $E_{HC}$, $R_{HC}$, $R_H^1$ and $R_H^2$ have the same meanings defined in claim 1 for compound ($H^C$).

3. The method of claim 2, wherein at least one compound (H) is a compound ($H^C$), and is reacted with compounds (F) different from compound ($F^C$).

4. The method of claim 3, wherein polymers of mixture (FH) have a backbone which comprises units ($R_{FHc}$).

5. The method according to claim 1, wherein said method ($M_{FH}$) comprises a Step (3) of contacting mixture (FH) with a source of molecular fluorine to effect fluorination of polymers of mixture (FH).

6. The method according to claim 5, said method ($M_{FH}$) further including an additional Step (2), after Step (1) and before Step (3), in which end groups of hydroxyl-type are protected, and wherein Step (2) is a step of converting hydroxyl groups of formula: HO—$(CR_H^1R_H^2)_{h1}$- and/or —$(CR_H^1R_H^2)_{h2}$-OH into corresponding fluoroformate groups of formula F—C(O)—O—$(CR_H^1R_H^2)_{h1}$- and/or formula —$(CR_H^1R_H^2)_{h2}$-O—C(O)—F.

7. The method of claim 6, said method ($M_{FH}$) further comprising a Step (4), after Step (3), wherein said Step (4) comprises reacting polymers having one or more than one fluoroformate group to provide corresponding polymers having one or more than one carboxylic acid groups of formula —COOH and/or ester group of formula —C(=O)O—$R_{alk}$ wherein $R_{alk}$ is a linear or branched alkyl chain comprising from 1 to 10 carbon atoms.

8. The method of claim 7, wherein in Step (4) mixture ($FF^{-OC(O)F}$) including polymers having one or more than one fluoroformate group is submitted to hydrolysis conditions in the presence of water, wherein polymers possessing fluoroformate end groups are advantageously decomposed through decarboxylation and dehydrofluorination, and are transformed into corresponding carboxylic acid-derivatives.

9. A mixture (mixture (FH)) of polymers comprising a partially fluorinated polyether backbone possessing a plurality of recurring units including at least one cyclic group and having two chain ends, wherein each of said chain ends comprises a group selected from hydroxy group, allyl group or vinyl group; and
said backbone comprises recurring units selected from the group consisting of units ($R_{FcH}$) and units ($R_{FHc}$):
unit ($R_{FcH}$): —O—$CF_2CHF$—$(CR_f^1R_f^2)_a$—O-$E_{cf}$-$R_{cf}$-$E_{cf}$-O—$(CR_f^1R_f^2)_b$—$CFHCF_2$—O—$(CR_H^1R_H^2)_{h1}$-$J_H$-$(CR_H^1R_H^2)_{h2}$-O—;
unit ($R_{FHc}$):
—O—$CF_2CHF$—$(CR_f^1R_f^2)_a$—O—$R_f$—O—$(CR_f^1R_f^2)_b$—$CFHCF_2$—O—$(CR_H^1R_H^2)_{h1}$-$E_{HC}$-$R_{HC}$-$E_{HC}$-$(CR_H^1R_H^2)_{h2}$-O—;
wherein:
$R_f$ is either a divalent, linear or branched, fluoro(hydro)carbon chain, wherein said fluoro(hydro)carbon chain comprises from 1 to 10 carbon atoms and is optionally interrupted by one or more oxygen atoms; or is a group of formula: -$E_f$-$R_{cf}$-$E_f$-;
$R_{cf}$ is a divalent fluorocarbon cyclic group, which may be a cycloaliphatic or a cycloaromatic group, which may comprise one or more than one cyclic moiety, and which may comprise one or more than one heteroatom included in the cycle, said heteroatom being selected from N, O and S;
each of $E_f$, equal to or different from each other, is a bond, or a divalent fluorocarbon group, possibly comprising one or more than one heteroatoms selected from Cl, N, O and S;
each or $R_f^1$ and $R_f^2$, equal to or different from each other, is F or a $C_1$-$C_6$ perfluorocarbon group;
a and b being independently zero or 1;
$J_H$ is either selected from a bond, a —O— group and a divalent linear or branched (oxy)alkylene group, wherein said (oxy)alkylene group comprises from 1 to 8 carbon atoms and is optionally interrupted by one or more than one ethereal oxygen atom; or is a group -$E_{HC}$-$R_{HC}$-$E_{HC}$-;
each of $E_{HC}$ is selected from a bond, a —O— group and a divalent linear or branched (oxy)alkylene group, wherein said (oxy)alkylene group comprises from 1 to 8 carbon atoms and is optionally interrupted by one or more than one ethereal oxygen atom;
$R_{HC}$ is divalent hydrocarbon cyclic group, which may be a cycloaliphatic or a cycloaromatic group, which may comprise one or more than one cyclic moiety, and which may comprise one or more than one heteroatom included in the cycle, said heteroatom being selected from N, O and S;
h1 and h2 being independently zero or 1;
each of $R_H^1$ and $R_H^2$, equal to or different from each other at each occurrence, is independently H or a $C_1$-$C_6$ hydrocarbon group.

10. The mixture (FH) of claim 9, wherein polymers of mixture (FH) have a backbone which comprises units ($R_{FHc}$).

11. The mixture (FH) of claim 9, which is a mixture of polymers of any of formulae below:

polymer($R_{FcH}^{bis-OH}$): HO—$(CR_H^1R_H^2)_{h1}$-$J_H$-{$(CR_H^1R_H^2)_{h2}$—O—$CF_2CHF$—$(CR_f^1R_f^2)_a$—O-$E_f$-$R_{cf}$-$E_f$-O—$(CR_f^1R_f^2)_b$—$CFHCF_2$—O—$(CR_H^1R_H^2)_{h1}$-$J_H$-}$_{nFH}$—$(CR_H^1R_H^2)_{h2}$-OH polymer($R_{FHc}^{bis-OH}$): HO—$(CR_H^1R_H^2)_{h1}$-$E_{HC}$-$R_{HC}$-$E_{HC}$-{$(CR_H^1R_H^2)_{h2}$-O—$CF_2CHF$—$(CR_f^1R_f^2)_a$—O—$R_f$—O—$(CR_f^1R_f^2)_b$—$CFHCF_2$—O—$(CR_H^1R_H^2)_{h1}$-$E_{HC}$-$R_{HC}$-$E_{HC}$-}$_{nFH}$—$(CR_H^1R_H^2)_{h2}$-OH polymer($R_{FcH}^{OH\text{-}vinyl}$): HO—$(CR_H^1R_H^2)_{h1}$-$J_{H'}$-{$(CR_H^1R_H^2)_{h2}$—O—$CF_2CHF$—$(CR_f^1R_f^2)_a$—O-$E_{f'}$-$R_{cf'}$-$E_{f'}$-O—$(CR_f^1R_f^2)_b$—$CFHCF_2$—O—$(CR_H^1R_H^2)_{h1}$-$J_{H'}$}$_{nFH}$—$(CR_H^1R_H^2)_{h2}$-O—$CF_2CHF$—$(CR_f^1R_f^2)_a$—O-$E_{f'}$-$R_{cf'}$-$E_{f'}$-O—$(CR_f^1R_f^2)_b$—CF=$CF_2$ polymer($R_{FHc}^{OH\text{-}vinyl}$): HO—$(CR_H^1R_H^2)_{h1}$-$E_{HC}$-$R_{HC}$-$E_{HC}$-{$(CR_H^1R_H^2)_{h2}$-O—$CF_2CHF$—$(CR_f^1R_f^2)_a$—O—$R_f$—O—$(CR_f^1R_f^2)_b$—$CFHCF_2$—O—$(CR_H^1R_H^2)_{h1}$-$E_{HC}$-$R_{HC}$-$E_{HC}$}$_{nFH}$—$(CR_H^1R_H^2)_{h2}$-$OCF_2CHF$—$(CR_f^1R_f^2)_a$—O—$R_f$—O—$(CR_f^1R_f^2)_b$—CF=$CF_2$ polymer($R_{FcH}^{bis\text{-}vinyl}$): $CF_2$=CF—$(CR_f^1R_f^2)_a$—O-$E_{f'}$-$R_{cf'}$-$E_{f'}$-O—$(CR_H^1R_H^2)_{h1}$-$J_{H'}$-{$(CR_H^1R_H^2)_{h2}$-O—$CF_2CHF$—$(CR_f^1R_f^2)_a$—O-$E_{f'}$-$R_{cf'}$-$E_{f'}$-O—$(CR_f^1R_f^2)_b$—$CFHCF_2$—O—$(CR_H^1R_H^2)_{h1}$-$J_{H'}$}$_{nFH}$—$(CR_H^1R_H^2)_{h2}$-O—$CF_2CHF$—$(CR_f^1R_f^2)_a$—O-$E_{f'}$-$R_{cf'}$-$E_{f'}$-O—$(CR_f^1R_f^2)_b$—CF=$CF_2$ polymer($R_{FHc}^{bis\text{-}vinyl}$): $CF_2$=CF—$(CR_f^1R_f^2)_a$—O-$E_{f'}$-$R_{cf'}$-$E_{f'}$-O—$(CR_H^1R_H^2)_{h1}$-$E_{HC}$-$R_{HC}$-$E_{HC}$-{$(CR_H^1R_H^2)_{h2}$-O—$CF_2CHF$—$(CR_f^1R_f^2)_a$—O—$R_f$—O—$(CR_f^1R_f^2)_b$—$CFHCF_2$—O—$(CR_H^1R_H^2)_{h1}$-$E_{HC}$-$R_{HC}$-$E_{HC}$}$_{nFH}$—$(CR_H^1R_H^2)_{h2}$-$OCF_2CHF$—$(CR_f^1R_f^2)_a$—O—$R_f$—O—$(CR_f^1R_f^2)_b$—CF=$CF_2$ wherein in formulae above nFH is an integer of 1 or more.

12. A mixture (mixture (FF)) of polymers comprising a fully fluorinated polyether backbone possessing a plurality of recurring units including at least one cyclic group; and said backbone comprises recurring units selected from the group consisting of units ($R_{FcF}$) and units ($R_{FFc}$):

unit (RFcF): —O—$CF_2CF_2$—$(CR_f^1R_f^2)_a$—O-$E_{cfF}$-$R_{cfF}$-$E_{cfF}$-O—$(CR_f^1R_f^2)_b$—$CF_2CF_2$—O—$(CR_F^1R_F^2)_{h1}$-$J_F$-$(CR_F^1R_F^2)_{h2}$-O—;

unit ($R_{FHc}$):
—O—$CF_2CF_2$—$(CR_f^1R_f^2)_a$—O—$R_{fF}$—O—$(CR_f^1R_f^2)_b$—$CF_2CF_2$—O—$(CR_F^1R_F^2)_{h1}$-$E_{FC}$-$R_{FC}$-$E_{FC}$-$(CR_F^1R_F^2)_{h2}$-O—;

wherein:
- each or $R_f^1$ and $R_f^2$, equal to or different from each other, is F or a $C_1$-$C_6$ perfluorocarbon group;
- a and b being independently zero or 1;
- $R_{fF}$ is either a divalent, linear or branched, perfluorocarbon chain, wherein said perfluorocarbon chain comprises from 1 to 10 carbon atoms and is optionally interrupted by one or more oxygen atoms; or is a group of formula: -$E_{fF}$-$R_{cf}$-$E_{fF}$-;
- $R_{cfF}$ is a divalent perfluorocarbon cyclic group, which may be a perfluorocycloaliphatic, which may comprise one or more than one cyclic moiety, and which may comprise one or more than one oxygen atom included in the cycle;
- each of $E_{fF}$, equal to or different from each other, is a bond, or a divalent perfluorocarbon group, possibly comprising one or more than one heteroatoms selected from Cl, and O;
- $J_F$ is either selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom; or is a group -$E_{FC}$-$R_{FC}$-$E_{FC}$-;
- each of $E_{FC}$ is selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom;
- $R_{FC}$ is divalent perfluorocarbon cyclic group, which may be a perfluorocycloaliphatic, which may comprise one or more than one cyclic moiety, and which may comprise one or more than one oxygen atom included in the cycle;
- h1 and h2 being independently zero or 1;
- each of $R_F^1$ and $R_F^2$, equal to or different from each other at each occurrence, is independently F or a $C_1$-$C_6$ perfluorocarbon group.

13. A mixture (FHOC(O)F) of polymers of any of formulae below:

polymer($R_{FcH}^{bis\text{-}OC(O)F}$): F—C(O)—O—$(CR_H^1R_H^2)_{h1}$-JH-{$(CR_H^1R_H^2)_{h2}$-O—$CF_2CHF$—$(CR_f^1R_f^2)_a$—O-$E_{f'}$-$R_{cf'}$-$E_{f'}$-O—$(CR_f^1R_f^2)_b$—$CFHCF_2$—O—$(CR_H^1R_H^2)_{h1}$-$J_{H'}$}$_{nFH}$—$(CR_H^1R_H^2)_{h2}$-O—C(O)—F polymer($R_{FHc}^{bis\text{-}OC(O)F}$): F—C(O)—O—$(CR_H^1R_H^2)_{h1}$-$E_{HC}$-$R_{HC}$-$E_{HC}$-{$(CR_H^1R_H^2)_{h2}$-O—$CF_2CHF$—$(CR_f^1R_f^2)_a$—O—$R_f$—O—$(CR_f^1R_f^2)_b$—$CFHCF_2$—O—$(CR_H^1R_H^2)_{h1}$-$E_{HC}$-$R_{HC}$-$E_{HC}$}$_{nFH}$—$(CR_H^1R_H^2)_{h2}$-O—C(O)—F polymer($R_{FcH}^{OC(O)F\text{-}vinyl}$): F—C(O)—O—$(CR_H^1R_H^2)_{h1}$-$J_{H'}$-{$(CR_H^1R_H^2)_{h2}$-O—$CF_2CHF$—$(CR_f^1R_f^2)_a$—O-$E_{f'}$-$R_{cf'}$-$E_{f'}$-O—$(CR_f^1R_f^2)_b$—$CFHCF_2$—O—$(CR_H^1R_H^2)_{h1}$-$J_{H'}$}$_{nFH}$—$(CR_H^1R_H^2)_{h2}$-O—$CF_2CHF$—$(CR_f^1R_f^2)_a$—O-$E_{f'}$-$R_{cf'}$-$E_{f'}$-O—$(CR_f^1R_f^2)_b$—CF=$CF_2$ polymer($R_{FHc}^{OC(O)\text{-}F\text{-}vinyl}$): F—C(O)—O—$(CR_H^1R_H^2)_{h1}$-$E_{HC}$-$R_{HC}$-$E_{HC}$-{$(CR_H^1R_H^2)_{h2}$-O—$CF_2CHF$—$(CR_f^1R_f^2)_a$—O—$R_f$—O—$(CR_f^1R_f^2)_b$—$CFHCF_2$—O—$(CR_H^1R_H^2)_{h1}$-$E_{HC}$-$R_{HC}$-$E_{HC}$}$_{nFH}$—$(CR_H^1R_H^2)_{h2}$-$OCF_2CHF$—$(CR_f^1R_f^2)_a$—O—$R_f$—O—$(CR_f^1R_f^2)_b$—CF=$CF_2$ polymer($R_{FcH}^{bis\text{-}vinyl}$): $CF_2$=CF—$(CR_f^1R_f^2)_a$—O-$E_{f'}$-$R_{cf'}$-$E_{f'}$-O—$(CR_H^1R_H^2)_{h1}$-$J_{H'}$-{$(CR_H^1R_H^2)_{h2}$-O—$CF_2CHF$—$(CR_f^1R_f^2)_a$—O-$E_{f'}$-$R_{cf'}$-$E_{f'}$-O—$(CR_f^1R_f^2)_b$—$CFHCF_2$—O—$(CR_H^1R_H^2)_{h1}$-$J_{H'}$}$_{nFH}$—$(CR_H^1R_H^2)_{h2}$-O—$CF_2CHF$—$(CR_f^1R_f^2)_a$—O- $E_{f'}$-$R_{cf'}$-$E_{f'}$-O—$(CR_f^1R_f^2)_b$—CF=$CF_2$ polymer($R_{FHc}^{bis\text{-}vinyl}$): $CF_2$=CF—$(CR_f^1R_f^2)_a$—O-$E_{f'}$-$R_{cf'}$-$E_{f'}$-O—$(CR_H^1R_H^2)_{h1}$-$E_{HC}$-$R_{HC}$-$E_{HC}$-{$(CR_H^1R_H^2)_{h2}$-O—$CF_2CHF$—$(CR_f^1R_f^2)_a$—O—Rf-O—$(CR_f^1R_f^2)_b$—$CFHCF_2$—O—$(CR_H^1R_H^2)_{h1}$-$E_{HC}$-$R_{HC}$-$E_{HC}$}$_{nFH}$—$(CR_H^1R_H^2)_{h2}$-$OCF_2CHF$—$(CR_f^1R_f^2)_a$—O—$R_f$—O—$(CR_f^1R_f^2)_b$—CF=$CF_2$ wherein in formulae above nFH is an integer of 1 or more; and wherein:

wherein:
- $R_f$ is either a divalent, linear or branched, fluoro(hydro)carbon chain, wherein said fluoro(hydro)carbon chain comprises from 1 to 10 carbon atoms and is optionally interrupted by one or more oxygen atoms; or is a group of formula: -$E_f$-$R_{cf}$-$E_f$-;
- $R_{cf}$ is a divalent fluorocarbon cyclic group, which may be a cycloaliphatic or a cycloaromatic group, which may comprise one or more than one cyclic moiety, and which may comprise one or more than one heteroatom included in the cycle, said heteroatom being selected from N, O and S;
- each of $E_f$, equal to or different from each other, is a bond, or a divalent fluorocarbon group, optionally comprising one or more than one heteroatoms selected from Cl, N, O and S;
- each or $R_f^1$ and $R_f^2$, equal to or different from each other, is F or a $C_1$-$C_6$ perfluorocarbon group;
- a and b being independently zero or 1;

$J_H$ is either selected from a bond, a —O— group and a divalent linear or branched (oxy)alkylene group, wherein said (oxy)alkylene group comprises from 1 to 8 carbon atoms and is optionally interrupted by one or more than one ethereal oxygen atom; or is a group $-E_{HC}-R_{HC}-E_{HC}-$;

each of $E_{HC}$ is selected from a bond, a —O— group and a divalent linear or branched (oxy)alkylene group, wherein said (oxy)alkylene group comprises from 1 to 8 carbon atoms and is optionally interrupted by one or more than one ethereal oxygen atom;

$R_{HC}$ is divalent hydrocarbon cyclic group, which may be a cycloaliphatic or a cycloaromatic group, which may comprise one or more than one cyclic moiety, and which may comprise one or more than one heteroatom included in the cycle, said heteroatom being selected from N, O and S;

h1 and h2 being independently zero or 1;

each of $R_H^1$ and $R_H^2$, equal to or different from each other at each occurrence, is independently H or a $C_1$-$C_6$ hydrocarbon group.

14. A mixture (FF—OC(O)F) of polymers of any of formulae below:

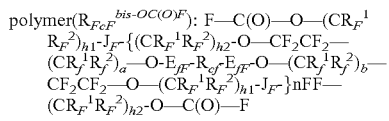

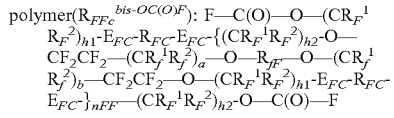

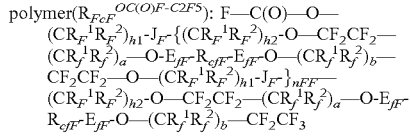

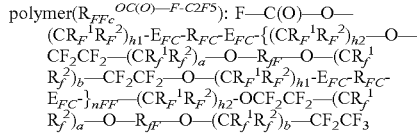

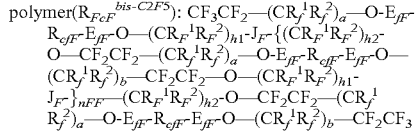

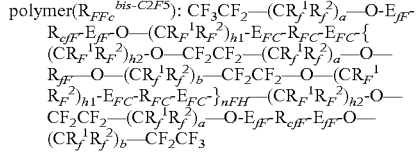

wherein in formulae above nFF is an integer of 1 or more; wherein:

$R_{fF}$ is either a divalent, linear or branched, perfluorocarbon chain, wherein said perfluorocarbon chain comprises from 1 to 10 carbon atoms and is optionally interrupted by one or more oxygen atoms; or is a group of formula: $-E_{fF}-R_{cfF}-E_{fF}-$;

$R_{cfF}$ is a divalent perfluorocarbon cyclic group, which may be a perfluorocycloaliphatic, which may comprise one or more than one cyclic moiety, and which may comprise one or more than one oxygen atom included in the cycle;

each of $E_{fF}$, equal to or different from each other, is a bond, or a divalent perfluorocarbon group, possibly comprising one or more than one heteroatoms selected from Cl, and O;

each or $R_f^1$ and $R_f^2$, equal to or different from each other, is F or a $C_1$-$C_6$ perfluorocarbon group;

a and b being independently zero or 1;

$J_F$ is either selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom; or is a group $-E_{FC}-R_{FC}-E_{FC}-$;

each of $E_{FC}$ is selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom;

$R_{FC}$ is divalent perfluorocarbon cyclic group, which may be a perfluorocycloaliphatic or a perfluorocycloaromatic group, which may comprise one or more than one cyclic moiety, and which may comprise one or more than one heteroatom included in the cycle, said heteroatom being selected from N, O and S;

h1 and h2 being independently zero or 1;

each of $R_F^1$ and $R_F^2$, equal to or different from each other at each occurrence, is independently F or a $C_1$-$C_6$ perfluorocarbon group.

15. A mixture (FF-COOH) of polymers of any of formulae below:

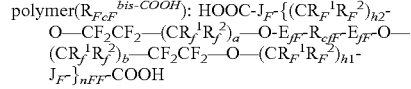

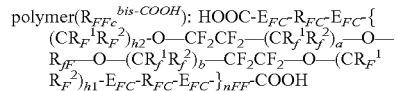

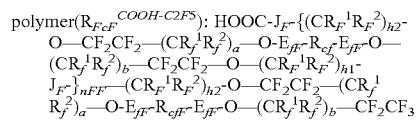

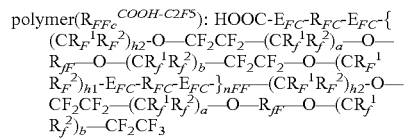

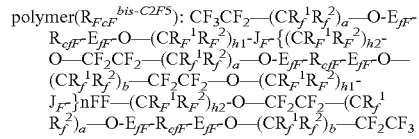

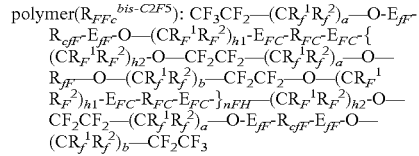

wherein in formulae above nFF is an integer of 1 or more; and wherein:

$R_{fF}$ is either a divalent, linear or branched, perfluorocarbon chain, wherein said perfluorocarbon chain comprises from 1 to 10 carbon atoms and is optionally interrupted by one or more oxygen atoms; or is a group of formula: $-E_{fF}-R_{cfF}-E_{fF}-$;

$R_{cfF}$ is a divalent perfluorocarbon cyclic group, which may be a perfluorocycloaliphatic, which may comprise one or more than one cyclic moiety, and which may comprise one or more than one oxygen atom included in the cycle;

each of $E_{fF}$, equal to or different from each other, is a bond, or a divalent perfluorocarbon group, possibly comprising one or more than one heteroatoms selected from Cl, and O;

each or $R_f^1$ and $R_f^2$ equal to or different from each other, is F or a $C_1$-$C_6$ perfluorocarbon group;

a and b being independently zero or 1;

$J_F$ is either selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom; or is a group $-E_{FC}-R_{FC}-E_{FC}-$;

each of $E_{FC}$ is selected from a bond, a —O— group and a divalent linear or branched perfluoro(oxy)alkylene group, wherein said perfluoro(oxy)alkylene group comprises from 1 to 8 carbon atoms and is optionally interrupted by one or more than one ethereal oxygen atom;

$R_{FC}$ is divalent perfluorocarbon cyclic group, which may be a perfluorocycloaliphatic or a perfluorocycloaromatic group, which may comprise one or more than one cyclic moiety, and which may comprise one or more than one heteroatom included in the cycle, said heteroatom being selected from N, O and S;

h1 and h2 being independently zero or 1;

each of $R_F^1$ and $R_F^2$, equal to or different from each other at each occurrence, is independently F or a $C_1$-$C_6$ perfluorocarbon group.

16. A method for lubricating a magnetic recording medium, comprising using the mixture of claim 9, or any derivative thereof.

* * * * *